US012807182B2

(12) United States Patent
Merfels et al.

(10) Patent No.: US 12,807,182 B2
(45) Date of Patent: Nov. 24, 2026

(54) METHOD AND CONTROL DEVICE FOR THE SITUATION-DEPENDENT DETERMINATION OF OBSERVATION AREAS FOR MOTOR VEHICLES OPERATED IN AN AT LEAST PARTIALLY AUTONOMOUS MANNER

(71) Applicant: Volkswagen Aktiengesellschaft, Wolfsburg (DE)

(72) Inventors: Christian Merfels, Braunschweig (DE); Wojciech Waclaw Derendarz, Braunschweig (DE); Carsten Last, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 211 days.

(21) Appl. No.: 18/249,443

(22) PCT Filed: Oct. 8, 2021

(86) PCT No.: PCT/EP2021/077799
§ 371 (c)(1),
(2) Date: Apr. 18, 2023

(87) PCT Pub. No.: WO2022/089913
PCT Pub. Date: May 5, 2022

(65) Prior Publication Data

US 2024/0109559 A1 Apr. 4, 2024

(30) Foreign Application Priority Data

Oct. 28, 2020 (DE) ..................... 10 2020 213 514.2

(51) Int. Cl.
*B60W 60/00* (2020.01)

(52) U.S. Cl.
CPC . *B60W 60/0015* (2020.02); *B60W 2510/0638* (2013.01)

(58) Field of Classification Search
None
See application file for complete search history.

(56) References Cited

U.S. PATENT DOCUMENTS 8,179,281 B2 5/2012 Strauss ......................... 340/903
8,751,134 B2 6/2014 Dorenkamp et al. ........... 701/96
(Continued)

FOREIGN PATENT DOCUMENTS

DE 102005051805 B3 5/2007 ............ B60W 30/14
DE 102006054220 A1 5/2008 ............ B60W 30/16
(Continued)

OTHER PUBLICATIONS

German Office Action, Application No. 102020213514.2, 7 pages, Apr. 26, 2021.
(Continued)

*Primary Examiner* — Shayne M. Gilbertson
(74) *Attorney, Agent, or Firm* — Slayden Grubert Beard PLLC

(57) ABSTRACT

The disclosure relates to a method for operating a motor vehicle at least partially autonomously, comprising obtaining at least one potential conflict area in which there is a potential for conflict with other road users, wherein, according to a planned driving maneuver, the conflict area is to be traversed by the motor vehicle. The method comprises determining at least one observation area which, for the purpose of traversing the conflict area, needs to be observed in order to avoid conflicts with the other road users; wherein at least one dimension of the observation area is determined taking into account at least one of the following:
a) a speed of the motor vehicle;
(Continued)

b) a type of a road user expected in the observation area;
c) an observed state of the traffic infrastructure.

16 Claims, 4 Drawing Sheets

(56) References Cited

U.S. PATENT DOCUMENTS

| | | | |
|---|---|---|---|
| 9,493,157 B2 | 11/2016 | Prokhorov | |
| 9,533,682 B2 | 1/2017 | Kühne | |
| 10,198,951 B2 | 2/2019 | Vanholme | |
| 11,492,010 B2 | 11/2022 | Furukawa | |
| 2018/0075309 A1* | 3/2018 | Sathyanarayana | G05D 1/0088 |
| 2019/0088125 A1 | 3/2019 | Park et al. | |
| 2019/0259282 A1* | 8/2019 | Ji | B60W 30/18154 |
| 2020/0139959 A1* | 5/2020 | Akella | G05D 1/0088 |
| 2020/0174481 A1* | 6/2020 | Van Heukelom | G01C 21/3407 |
| 2020/0264622 A1* | 8/2020 | Tokumochi | G05D 1/0221 |
| 2021/0061269 A1* | 3/2021 | Petroff | B60W 30/0956 |
| 2021/0129834 A1* | 5/2021 | Gier | B60W 30/0956 |
| 2022/0111859 A1* | 4/2022 | Lu | G01C 21/3602 |
| 2022/0315027 A1* | 10/2022 | Behring | B60K 35/00 |

FOREIGN PATENT DOCUMENTS

| | | | | |
|---|---|---|---|---|
| DE | 102007048809 A1 | 7/2008 | B60W 30/08 |
| DE | 102014016815 A1 | 5/2016 | B60W 30/09 |
| DE | 102016100737 A1 | 8/2016 | B60W 30/08 |
| DE | 102016212727 A1 | 1/2018 | B60W 30/08 |
| DE | 102016224061 A1 | 6/2018 | B60W 30/08 |
| DE | 102016226047 A1 | 6/2018 | B60R 21/0134 |
| DE | 112019001511 T5 | 1/2021 | B60T 7/12 |
| DE | 102020213514 A1 | 4/2022 | B60W 30/08 |
| EP | 3091370 A1 | 11/2016 | B60W 50/00 |
| EP | 3028266 B1 | 9/2017 | B60W 30/08 |
| EP | 3016828 B1 | 3/2019 | B60W 30/18 |
| EP | 3428028 B1 | 2/2020 | B60Q 1/34 |
| JP | 2010079565 A | 4/2010 | B60R 1/00 |
| WO | 2019/181708 A1 | 9/2019 | B60T 7/12 |
| WO | 2022/089913 A1 | 5/2022 | B60W 30/09 |

OTHER PUBLICATIONS

International Search Report and Written Opinion, Application No. PCT/EP2021/077799, 16 pages, Jan. 24, 2022.

* cited by examiner

METHOD AND CONTROL DEVICE FOR THE SITUATION-DEPENDENT DETERMINATION OF OBSERVATION AREAS FOR MOTOR VEHICLES OPERATED IN AN AT LEAST PARTIALLY AUTONOMOUS MANNER

CROSS-REFERENCE TO RELATED APPLICATIONS

This application claims priority to German Patent Application No. DE 10 2020 213 514.2, filed on Oct. 28, 2020 with the German Patent and Trademark Office. The contents of the aforesaid patent application are incorporated herein for all purposes.

TECHNICAL FIELD

The invention relates to a method for operating a motor vehicle in an at least partially autonomous manner and in particular for suitably determining observation areas for this operation. Furthermore, the invention relates to a control device for carrying out such a method. The motor vehicle may, in particular, be a passenger car or a truck.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

During at least partially autonomous (or also partially automatic) operation of a motor vehicle, the motor vehicle can typically carry out steering movements and/or acceleration processes autonomously of the driver. This requires the motor vehicle to observe or, in other words, monitor or detect its surroundings. In particular, other road users which could present a threat of a conflict and in particular a collision should be detected. A wide variety of sensors are used to observe (or also to detect or monitor) the surroundings, in particular camera systems, lidar sensors, radar sensors, or ultrasonic sensors. What is known as V2X information, which is transmitted from digital traffic infrastructure to the motor vehicle, can also be evaluated. This can indicate, for example, that lanes or pedestrian crossings are currently occupied. All of the sensors and/or information sources mentioned above for observing the surroundings can also be used in the present solution.

Until now, one challenge when operating a motor vehicle at least partially autonomously has been to determine which concrete areas of the environment must be observed before performing planned driving maneuvers. More precisely, until now it has been difficult to determine which areas of the environment must be observed in order to rule out conflicts with other road users before a planned driving maneuver can be performed. In the case of improper determination of the observation areas, driving maneuvers can be unnecessarily delayed or undesired safety risks can arise. It has also been difficult until now to deal with situations in which an observation area cannot be completely observed (i.e., detected with sensors) from the perspective of the vehicle because, for example, it is partially concealed.

SUMMARY

A need exists to improve the operation of motor vehicles operated in an at least partially autonomous manner, for example with regard to observation areas defined for performing driving maneuvers.

The need is addressed by the subject matter of the independent claims. Some embodiments are presented in the dependent claims, the description, and the drawings.

DESCRIPTION

Figure 1:
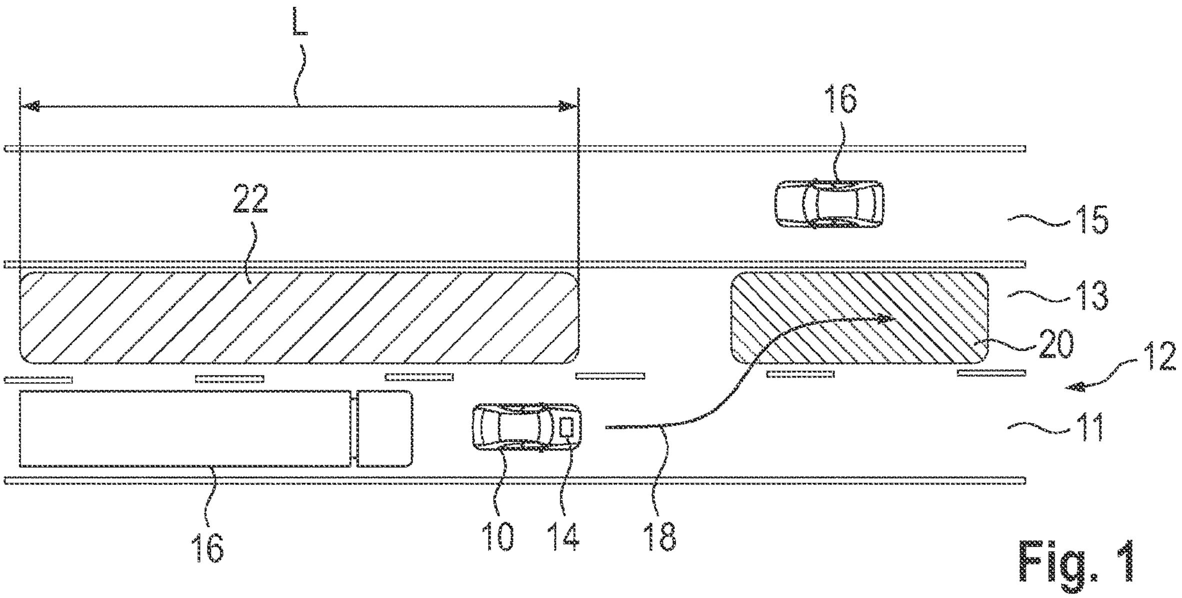
FIGS. 1 to 3 show example driving maneuvers and conflict and observation areas defined for this.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The teachings herein generally provide a situation-dependent determination of at least one dimension of an observation area, in particular establishing it in real time and/or dynamically during driving operation. For this purpose, the teachings herein propose suitable variables, parameters, and/or properties that can be established and/or used to determine the dimension(s). In this way, it is ensured that the observation area is actually appropriate to the situation, meaning it is not unnecessarily large but also not inadequately small. As a result, delays in performing the driving maneuver, which would be probable with an unnecessarily large observation area, can be prevented. Safety risks that would occur with an inadequately small observation area can also be avoided.

In particular, a method is proposed for operating a motor vehicle at least partially autonomously (and for example automatically and/or fully autonomously), comprising:

- obtaining at least one potential (virtual) conflict area in which there is a potential for conflict with other road users, wherein, according to a planned driving maneuver, the conflict area is to be traversed (in particular driven through or crossed) by the motor vehicle;
- determining at least one (virtual) observation area which, for the purpose of traversing the conflict area, needs to be observed (in particular observed by means of sensors or also monitored by means of sensors and/or detected by means of sensors) in order to avoid conflicts with the other road users;

wherein at least one dimension of the observation area is determined taking into account at least one of the following:

a) a speed of the motor vehicle;
b) a type of a road user expected in the observation area;
c) an observed state of the traffic infrastructure.

The conflict area and the observation area can each correspond to and/or reproduce or model areas of the vehicle's environment. In particular, the conflict area and the observation area are at least two-dimensional. Additionally or alternatively, they can comprise or cover a surface of the environment and/or of an environmental model of the motor vehicle (or, in other words, surroundings model or environment model).

During the at least partially autonomous operation of the motor vehicle, maneuver planning takes place in a known manner, in particular in the context of driving route planning and/or the dynamic response to current traffic events (e.g., to change lanes or overtake). It is therefore for example provided to determine, for correspondingly planned driving maneuvers, those areas of the vehicle's environment which present a threat of conflicts with other road users. These can be, for example, areas potentially occupied by other road users, which are also traversed by the motor vehicle while it performs the driving maneuver. Examples of potential conflict areas are lanes to be crossed, targeted occupied areas in adjacent lanes in the context of a lane change, crossed pedestrian crossings, or intersected bike paths. Such conflict areas can be determined dynamically, for example, during dynamically planned driving maneuvers such as a lane change. Additionally or alternatively, they can be determined in advance on the basis of or as a component of map information and read out and thereby obtained, for example, during operation of the vehicle. For example, based on the map information, conflict areas can be assigned in advance to specific areas of the map, for example, intersections, pedestrian crossings, bike paths, junctions, and the like.

Observing an observation area can be understood to mean that a targeted monitoring and in particular a detection by means of sensors of the observation area takes place in order to rule out that other road users are occupying the area (at least other road users of a specific type). For example, the planned driving maneuver is performed in an originally planned way (meaning, for example, without a significant change in speed and/or at a planned point in time) only when the observation area is free of other road users.

In some embodiments, the method also comprises determining a portion of the observation area that can be observed by the motor vehicle and, based thereon, controlling the traversing of the conflict area. The observable portion (in particular its scale) can be used as an additional condition for performing the driving maneuver. Put another way, the conflict area is for example traversed by the motor vehicle also taking into account the observable portion, or, respectively, the driving maneuver and/or the operation of the vehicle is also controlled based on this observable portion. If this takes up the entire observation area or at least a desired minimum portion, the driving maneuver can be performed in a planned manner without, for example, additional wait times or braking. However, if the observation area cannot be satisfactorily observed (by means of sensors) and the observable portion is impermissibly small, deviating measures can be taken and the planned driving maneuver can be changed and/or delayed.

To determine the observable portion, a current sensor detection area of the motor vehicle can be established according to approaches known from the prior art; see, for example, DE 10 2016 100 737 A1, incorporated by reference herein. A type of sensor observation area or also sensor detection area can also be established, for example by any relevant surroundings sensors of the motor vehicle. The observable portion can correspond to an overlap area of this sensor detection area and the observation area. The areas and in particular their possible overlap can in turn be determined with the aid of a surroundings model of the vehicle.

The motor vehicle may also be referred to as an ego vehicle. Its speed can be determined with conventional speed sensors. The type of road users expected in the observation area can be predefined and established, for example, using map information. For example, it can be determined which types of traffic infrastructure and/or traffic paths are in the observation area, for which purpose in particular map information can be used. Based thereon, it can be established which road users are assigned to this detected traffic infrastructure and/or these detected traffic paths, meaning that they are expected there (for example, pedestrians on sidewalks or pedestrian crossings, cyclists on bike paths, and motor vehicles on road sections).

The observed state of the traffic infrastructure can be a state of the traffic infrastructure detected by means of sensors of the motor vehicle. As a result, deviations between, for example, map information and actually present states of the traffic infrastructure can be determined, that is to say whether an unexpected disruption, for example, due to construction, traffic jams, or accidents, is present there.

The dimension of the observation area can be determined virtually or, respectively, based on data, for example, by corresponding dimensioning of the virtual observation area in a surroundings model.

Some embodiments provide that the dimension according to the previous variant a) is determined and gets higher as the speed of the motor vehicle increases. As a result, it can be taken into account that at higher speeds, longer braking distances also ensue. As a result, conflicts with other road users can still occur in an area farther away from the vehicle, even when braking is initiated. These embodiments are beneficial in particular when the planned driving maneuver relates to driving towards and/or crossing a potential obstacle or conflict area, for example, driving towards a pedestrian crossing (e.g., a crosswalk), an entrance or exit area, or an intersection, in particular when the motor vehicle is located on a priority road. It can be established, for example, on the basis of map information, that such an obstacle or conflict area is present.

According to another example and building on the previous variant a), it is provided that, when a priority road traversed by another road user is in the conflict area, the dimension gets smaller as the speed of the motor vehicle increases. This is based on the idea that the motor vehicle can also leave the conflict area again correspondingly quickly due to the increased speed. As a result, comprehensive observation of the environment for the purpose of conflict and in particular collision avoidance at high speed of the ego vehicle is not necessarily required. This variant relates, for example, to crossing the priority road and/or turning onto a corresponding priority road. It can be established, for example, on the basis of map information, that the road is a priority road.

According to another example and building on the previous variant b), an expected speed of the expected road user is obtained and as the expected speed increases, the dimension gets larger and/or larger the greater the expected speed is. Expected speeds can be assigned to each expected road user, which can be established, for example, in the previously explained manner on the basis of map information. For example, certain speed ranges of a few kilometers per hour can be assigned to expected road users such as pedestrians or cyclists (e.g., a maximum of 35 km/h for cyclists). If the expected road user is a motor vehicle, an expected speed according to locally applicable speed limits plus a possible safety buffer can be used as the basis for the expected speed, for example depending on the currently traversed traffic path (e.g., an urban or non-urban road).

Generally, in order to avoid conflicts it is provided that the ego vehicle should constantly maintain a certain minimum distance and/or differential speed to other road users. In particular, it can be desired that the motor vehicle establishes a corresponding minimum distance or differential speed to other road users in as timely a manner as possible after driving into and/or generally after or during the traversing of a conflict area. Accordingly, the dimensions of the observation area can also be oriented toward the requirement of the differential speed and/or minimum speed to be achieved. If other road users, as expected, have high speeds in the vehicle's surroundings, it can therefore be possible to select the observation area to be sufficiently large. Namely, less time and/or space then remains for the ego vehicle to establish the minimum distance and/or the differential speed itself compared to these road users, for example, when changing lanes or turning into another road. Therefore, the observation area should be selected to be large enough that it is ensured that road users can also be detected at a greater distance from the ego vehicle.

As mentioned, the expected speed can be determined taking into account map information. Based thereon, it can be established which type of road users with which typical speeds are expected and/or which speeds are expected due to currently present types of traffic paths (e.g., urban roads, non-urban roads, or highways) and/or generally applicable speed limits.

In another example, which builds on the previous variant c), when the observed state of the traffic infrastructure indicates a lack of traversability of at least a part of the environment, the dimension of the observation area is determined such that the portion of the non-traversable part in relation to the observation area is below a permissible maximum portion.

Put another way, the observation area can be defined by the dimension determination such that the observation area contains the non-traversable area only in small part or not at all (i.e., the permissible maximum portion can also be 0%). This makes it possible for only that observation area to be actually evaluated which can be occupied by other road users. In particular, in this way, it is avoided that, for example, construction sites and their equipment that occupy the non-traversable portion are erroneously detected as other road users. In particular, a construction site can be detected as a non-traversable portion by camera monitoring and furthermore in particular by image evaluation and/or traffic sign detection. Stationary vehicles can also be detected as obstacles that at least temporarily block a lane so that a lack of traversability is present there. Turning vehicles that temporarily block lanes during the turning process can also at least temporarily make the corresponding lane non-traversable and the observation area can be correspondingly reduced.

It is understood that an initial observation area according to any variant described herein can also be determined initially, but then the dimensions of the observation area can be adapted in the described manner to define the actually observed or, respectively, evaluated observation area based on a determined non-traversable portion.

As already mentioned, some embodiments provide determining a portion of the observation area that is observable by the motor vehicle (i.e., can be seen by means of sensors, can be detected by means of sensors, or can be monitored by means of sensors) and, based thereon, controlling the traversing of the conflict area. For example, a speed of the motor vehicle is reduced when the observable portion is below a minimum portion (of the observation area). The minimum portion can also be 100%, i.e., complete observability can be required.

Due to the speed reduction, the motor vehicle can feel its way, so to speak, into the conflict area in order to respond in time to undetected road users that are located or have been located in the non-observable portion of the observation area. This can also increase the probability that the non-observable portion is reduced as the vehicle drives into the conflict area (e.g., due to a correspondingly changed detection angle of the vehicle sensors in relation to the environment). Furthermore, time to detect further information can be gained through the reduced speed, which can also be at least temporarily reduced to a speed of 0 km/h (that is to say, can result in an at least temporary stop). For example, it can then be established in the manner described below whether it is realistic that another expected road user is actually located in the non-observable portion, or, if this were the case, whether it would already have had to drive into the observable portion.

It is understood that, additionally or alternatively, a non-observable portion of the observation area can also be established. To ensure a sufficient observability, it can be determined whether this portion is below a permissible maximum value. The observable and non-observable portions can correspond to each other and/or can be converted clearly into each other. They can, for example, always take up 100% of the observation area together. Thus, considerations on the basis of the observable portion can also always be equivalent to considerations on the basis of the non-observable portion, and vice versa.

Accordingly, some embodiments of the method provide, when the observable portion is below a (permissible and/or predefined) minimum portion and/or the non-observable portion is above a (permissible and/or predefined) maximum portion:

- obtaining at least one type of a road user expected in the observation area (e.g., from map information in the manner described herein);
- establishing that no other road user is located in the observation area, on the basis of the observable portion of the observation area and the type of road user.

As discussed, an expected speed of the road user can also be established based on the type of road user. Based thereon, it can be calculated whether this road user would not have already needed to drive into the observable portion in the case that it occupies the remaining non-observable portion of the observation area, assuming that it drives there with the expected speed. If this has not occurred, for example, due to a time that has elapsed in the meantime, it can be assumed that no road user of the expected type and/or with the expected speed is located in the non-observable portion.

However, an expected size can also be established (e.g., a length dimension) for the expected road user. If a non-observable portion is smaller than the expected size, it can be inferred that no other road user is located therein.

Some embodiments provide that, when the observable portion surrounds a non-observable portion of the observation area (that is to say, surrounds it on at least two sides and/or encloses it within itself or delimits it on both sides), a maximally possible speed of another (in particular expected) road user that is potentially located in the non-observable portion is determined.

This scenario takes into account the case that a small portion of the observation area lying between the observable portions is not observable because it is concealed, for example, by a local obstacle. In this non-observable portion, an expected road user and its expected speed can initially be assumed. However, it can then be determined once again that, when the road user does not drive into the observable portion after a certain time, which is dependent on the size of the non-observable portion, it cannot have moved in the non-observable portion with the corresponding speed.

As a possible potential for danger, the scenario would still remain in which a road user located in the non-observable portion drives with a considerably lower speed, which, however, can be assessed as harmless because there are sufficient reaction possibilities. Alternatively, the driver can accelerate maximally from a standstill and enter the corresponding portion with the speed that is maximally achievable before reaching an observable portion. The latter represents an example of a maximally possible speed that the other road user can achieve in the non-observable portion (e.g., before directly exiting from it). It can then be established whether the road user represents a danger (i.e., can reach the conflict area during the driving maneuver) for the purpose of traversing the conflict area (meaning performing the planned driving maneuver) and the operation of the vehicle can be controlled on this basis. If there is no danger, the driving maneuver can be performed as planned.

The present teachings also relate to a control device for a motor vehicle, which is configured to carry out a method according to one or more embodiments/examples discussed in the preceding. The control device can be operable digitally and/or electronically. It can have at least one processor apparatus and/or at least one memory apparatus. Program instructions can be saved on the memory apparatus and, when executed by the processor apparatus, can cause the control device to take and/or perform any measures and method steps described herein. In particular, the control device can be connected to a driving maneuver and/or driving route planning unit, in particular to a control device that carries out such planning. The control device can also have a software component that carries out such planning. Generally, the control device can be configured to carry out a method according to any of the described aspects and also with any variants and/or developments described therein.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

Each of the following FIGS. describes situations in which example embodiments of the method disclosed herein are carried out. These methods are each performed by a control device 14 of a motor vehicle 10 in the manner described herein. FIGS. 1 to 6 each show top views of exemplary operating situations and in particular driving maneuvers of a motor vehicle (ego vehicle) 10. Movement arrows and/or conflict and observation areas depicted in this context are of a virtual nature and can be defined, for example, in a surroundings model of the motor vehicle 10 with corresponding dimensions, positions, and/or extents. In each of the examples shown, the motor vehicle 10 is operated and in particular steered and/or accelerated at least partially autonomously and for example fully autonomously or, respectively, fully automatically.

The motor vehicle 10 comprises a control device 14, only indicated schematically, which obtains or determines the planned driving maneuver and carries out any measures according to the teachings described herein, in particular the determination of the conflict area 20 including associated definitions of observation areas 22. The following FIGS. each assume an identical motor vehicle 10 with an identical control apparatus 14, even if the latter is not depicted there again separately.

In FIG. 1, the motor vehicle 10 is located in the right lane 11 of a two-lane road 12. Another lane 15 is also shown, on which other road users 16 (by way of example another vehicle) drive in the opposite direction. A truck is positioned in the same lane 11 as the motor vehicle 10 and behind it as another exemplary road user 16.

As indicated by a movement arrow 18, the motor vehicle 10 would like to change lanes from the right to the left lane 11, 13 as a planned driving maneuver. The planned or, respectively, targeted area of the left lane 13, into which the motor vehicle 10 would like to drive, is an example of a conflict area 20. Other road users 16 may thus be located in this conflict area 20 or drive into it during the driving maneuver, which can lead to a possible collision.

To ensure that the vehicle 10 can actually drive into the conflict area 20, an observation area 22 is therefore established based on the planned driving maneuver and the associated conflict area 20. This observation area 22 must be monitored by the vehicle 10 by means of surroundings sensors (not shown separately). More precisely, as part of this monitoring it must be ensured that no other road user 16 is located in the observation area 22. As will be explained below, in specific situations it can be sufficient to determine that another road user 16 located in the observation area 22 does not present a collision risk because it does not present a danger of driving into the conflict area 20 during the driving maneuver.

The present solution generally provides determining the observation area 22 not globally and/or independently of the current situation. Put another way, it is for example not provided to always determine the same unchanged observation area 22 depending on a determined driving maneuver and/or an associated potential conflict area 20. Instead, it is provided to establish at least one dimension in a situation-dependent manner. In FIG. 1, this relates, by way of example, to the length L of the observation area 22 along the left lane 13. The situation-dependent determination of the dimension for example takes place in real time and/or depending on current and/or varying environment or operating variables of the vehicle 10 and/or of other road users 16.

In the case of FIG. 1, the dimension L of the observation area 22 is for example established dynamically depending on the speed of the motor vehicle (for short: vehicle) 10. If it is high, it can be assumed that a desired minimum distance and/or a desired differential speed can be created relatively quick to other road users 16 (not shown) located in the left lane 13. As a result, collisions can be prevented or at least their intensity can be reliably limited. Accordingly, at high speeds of the motor vehicle 10, the dimension L of the observation area 22 is smaller because other road users 16 farther away in the left lane 13 (not shown) may potentially mean a lower collision hazard. The assessment of the collision hazard can, however, require knowledge of the speed of the other road users 16 and can be established reliably based on a differential speed. Generally, the following can apply: The lower the differential speed between the ego motor vehicle 10 and vehicles or, respectively, other road users 16 possibly coming from behind, the lower or, respectively, shorter the observation area 22 can be. The speed of other road users 16 can be detected by means of sensors of the vehicle 10.

Figure 2:
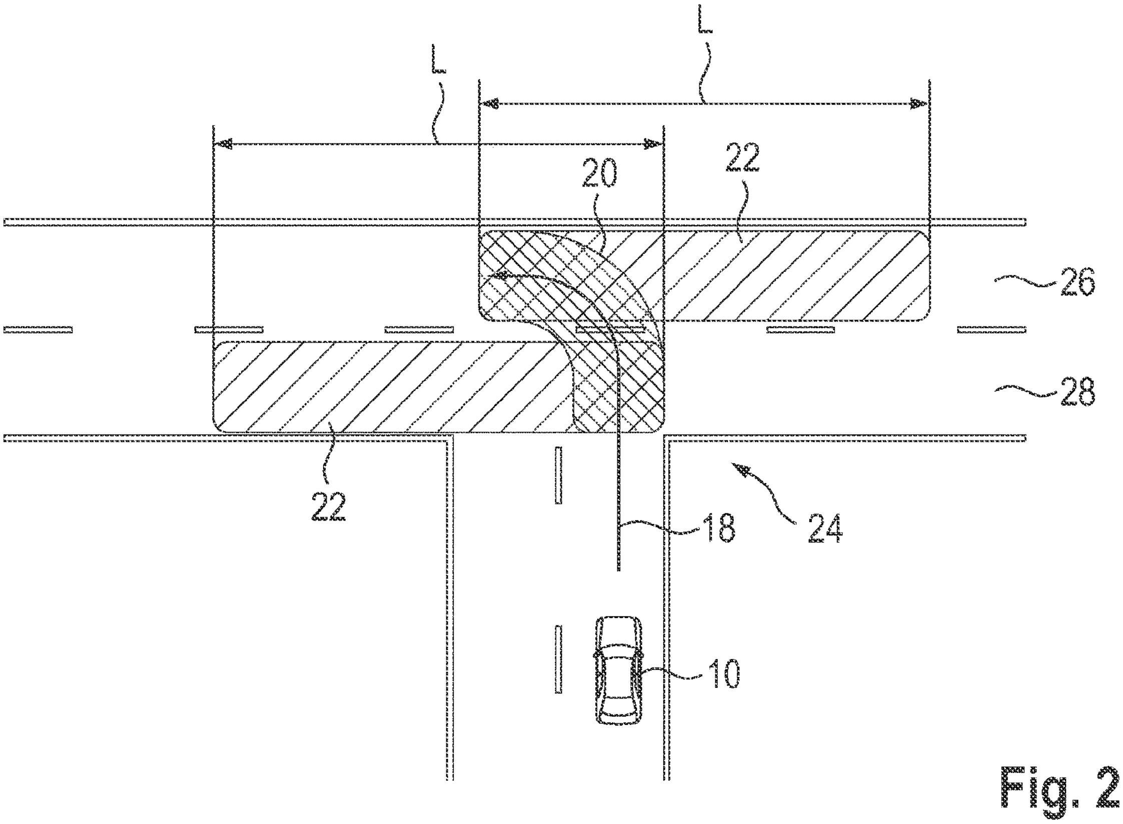

In FIG. 2, the motor vehicle 10 is shown in the context of another planned driving maneuver. According to the planned movement arrow 18, the vehicle 10 would like to turn onto an intersecting road 24. More precisely, it would like to turn onto the upper lane 26 in FIG. 2 and in doing so must cross a lower lane 28 of the road 24 in FIG. 2. The conflict area 20 related to the planned driving maneuver extends as a result over both lanes 26, 28 of the road 24. Therefore, two observation areas 22, shown separately from each only by way of example, are also defined, each of which extend along one of the lanes 26, 28. In this case, other road users 16 (not shown) have the right of way in relation to the vehicle 10 on both of the lanes 26, 28. If the vehicle 10, however, has a high speed, it can leave the conflict area 20 again quickly. Accordingly, the observation areas 22 and in particular their length L can then get smaller as the speed of the vehicle 10 increases.

Figure 3:
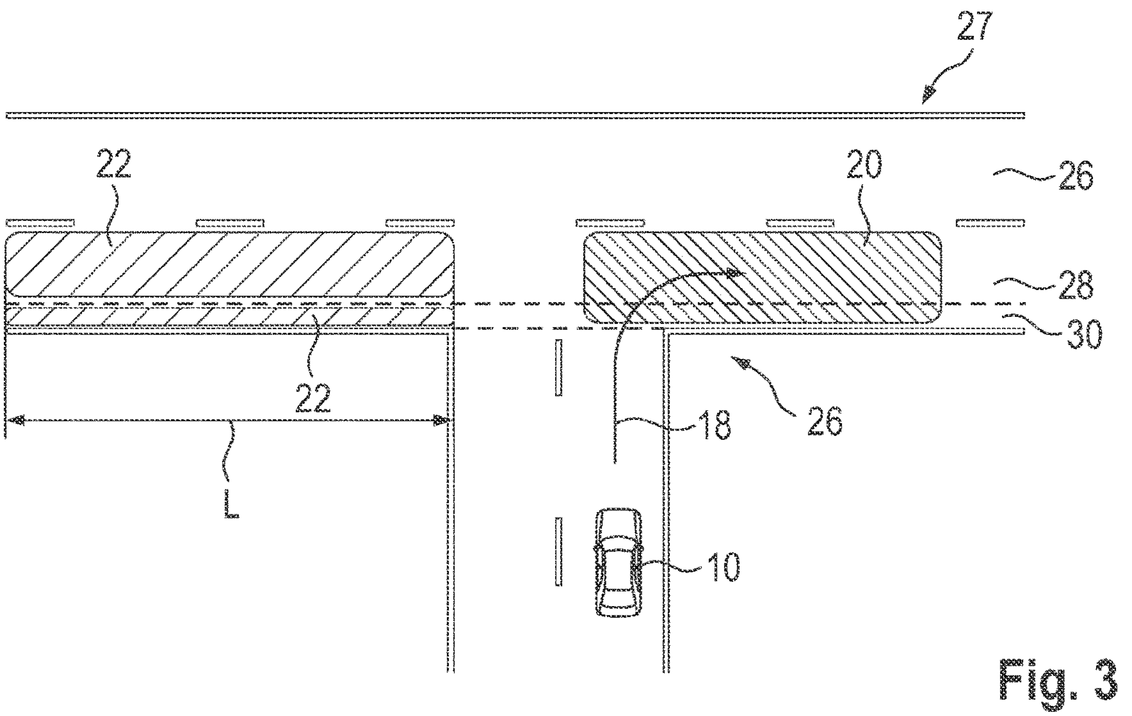

In FIG. 3, turning onto a priority road 27 is shown analogously to FIG. 3 as the planned driving maneuver. According to the planned movement arrow 18, however, the vehicle now intends to turn onto the lower lane 28 lying closer to the motor vehicle 10 and not onto the upper lane 26. Also deviating from FIG. 3, a bike path 30 must also be crossed in this case. The conflict area 20 thus includes portions of the bike path 30 and the lower lane 28.

As indicated, separate observation areas 22 are for example defined for the lane 28 and the bike path 30 or the observation area 22 is divided accordingly. As a result, it can be determined which type of road user is expected and must be primarily detected in the corresponding observation area 22 or, respectively, portion of the observation area 22.

Generally, the road user type can be used to define a shape and/or size of an observation area 22, for example, a (width and/or height) dimension transversely to a (length) extent in the expected driving direction.

Additionally or alternatively, a detection of the surroundings by means of sensors and/or algorithmic sensor data evaluation can be adapted based on the expected road user type. The attention of sensors or algorithms can then be directed, for example, at specific environmental areas (known as "regions of interest"), in which the type of road user is expected. For example, the sensor can function with a higher resolution in this area or the algorithmic evaluation of this area or, respectively, of the sensor data detected for this purpose can be given more computing capacity. For example, the sensor data from this area can be calculated algorithmically with a significant reduction in resolution.

Accordingly, observation areas 22 are thus defined in FIG. 3 according to the type of expected road users. Deviating from FIG. 3, in this case it can be provided in particular that a length dimension L of the observation area 22, which includes the bike path 30, is smaller than a dimension L, extending parallel to it, of the observation area 22 in the area of the lane 28. This is based on the idea that the cyclists have, as expected, a lower expected speed and thus only represent an actual collision risk at a smaller distance from the conflict area 22. Put another way, cyclists that are farther away from the conflict area 20 can presumably not reach the conflict area 20 while the driving maneuver is being performed (that is to say, driving into the conflict area 20) and therefore cannot cause a collision there.

Based on FIG. 3, the case of an observation of the traffic infrastructure and corresponding definitions of observation areas 22 is explained in the following, even if this only partially evident from FIG. 3. The case that the bike path 30 is closed due to construction taking place there is thus conceivable. The vehicle 10 can recognize this, for example, in a camera-based manner and/or by means of traffic sign recognition. Accordingly, the observation area 22 can correspond in the area of the bike path 30 to a part of the environment that is not affected by the construction site and thus the dimension L can be reduced accordingly. Optionally, the dimension L can be set to the value of zero, meaning the observation area 22 in the area of the bike path 30 can generally be omitted. In this case, however, it may be additionally necessary to detect both primarily motor vehicles and also cyclists as other road users 16 in the remaining observation area 22 along the lane 28.

The latter means that another type of road user 16 is expected in this observation area 22. Generally, it may be necessary to determine again and in particular enlarge dimensions of an observation area 22 when the other type of road user 16 is characterized through a higher expected speed. Due to a possibly increased mobility or also maneuverability (in particular of cyclists), it may also be necessary to select dimensions and in particular borders of the observation area 22 to be more precise and/or finer. Also due to deviating size proportions (smaller or narrower cyclists in comparison with motor vehicles), detections (e.g., by means of sensors and/or algorithms) with a finer resolution may be necessary in the observation area 22.

A benefit of the knowledge that specific observation areas 22 are not traversable by other road users 16 is also that the vehicle 10 can drive directly through these observation areas 22 and, for example, directly up to an intersecting road. In addition, it can also orient itself in any way in such an observation area 22, for example, in preparation for a turning process.

Figure 4:
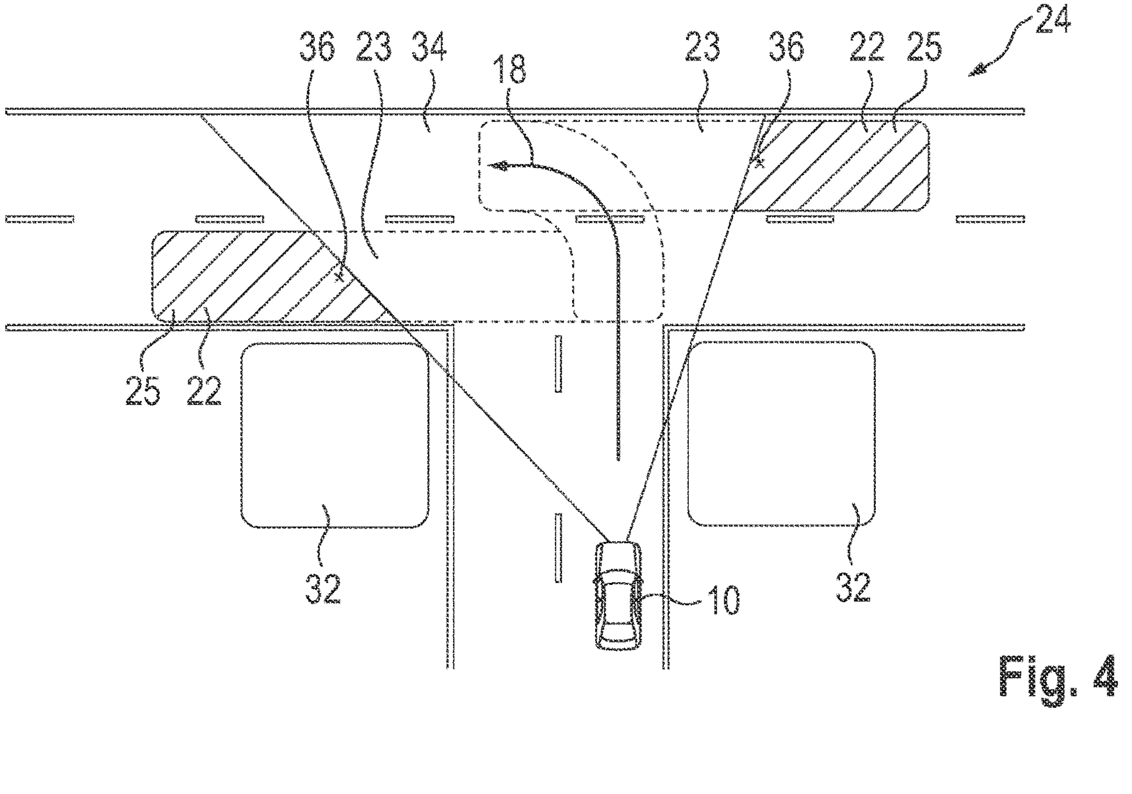
FIGS. 4 to 6 show example situations in which an observation area can only be partially observed or, respectively, detected by a vehicle.

In FIG. 4, an analogous planned driving maneuver is shown as in FIG. 2. In this case, however, visual obstacles 32, for example, in the form of structures or trees, are located near the vehicle 10. Depicted is a detection area (or also visual area) 34 of the vehicle 10, in which the environment is detected by means of sensors of the vehicle 10 and can thereby be observed by means of sensors or, respectively, monitored by means of sensors. It can be seen that the detection area 34 does not completely cover the observation area 22. Therefore, an observable portion 23 of each observation area 22 that overlaps with the detection area 34 exists as well as a non-observable portion 25, which is outside the detection area 34.

In this case, it can initially be determined in the manner described herein which type of road user is expected within the observation area 22. According to one variant, an expected size (and in particular a maximum size and in particular a maximum length) can be assigned to this road user. If this size exceeds the non-observable portion 25 of each observation area 22, it can be assumed that no corresponding other road user 16 (not shown in FIG. 4) is located within the observation area 22 and in particular in the non-observable portion 25. If this is not the case, this scenario cannot be ruled out.

Alternatively or additionally, an expected speed, possibly with the addition of a safety buffer or safety addition, can be determined for the road user 16 (not shown in FIG. 4) expected in each observation area 22. It can then be established whether there is a danger that a road user can drive from the non-observable portion 25 into the conflict area 22 during the planned performance duration of the driving maneuver and due to the expected speed. As an additional safety measure, it can be assumed in this case that the road user is positioned farthest forward within the non-observable portion 35 relative to the conflict area 20, that is to say, is located at the shortest possible distance from the conflict area 20. In FIG. 4, corresponding exemplary positions 36 are depicted within the non-observable portions 25. It is determined that, in particular starting from these positions 36, it is not possible for the road user to reach the conflict area 20 if the driving maneuver is performed in the originally planned way. Otherwise, it takes place in a modified form, for which examples were mentioned above and will be explained separately based on FIG. 7.

Figure 5:
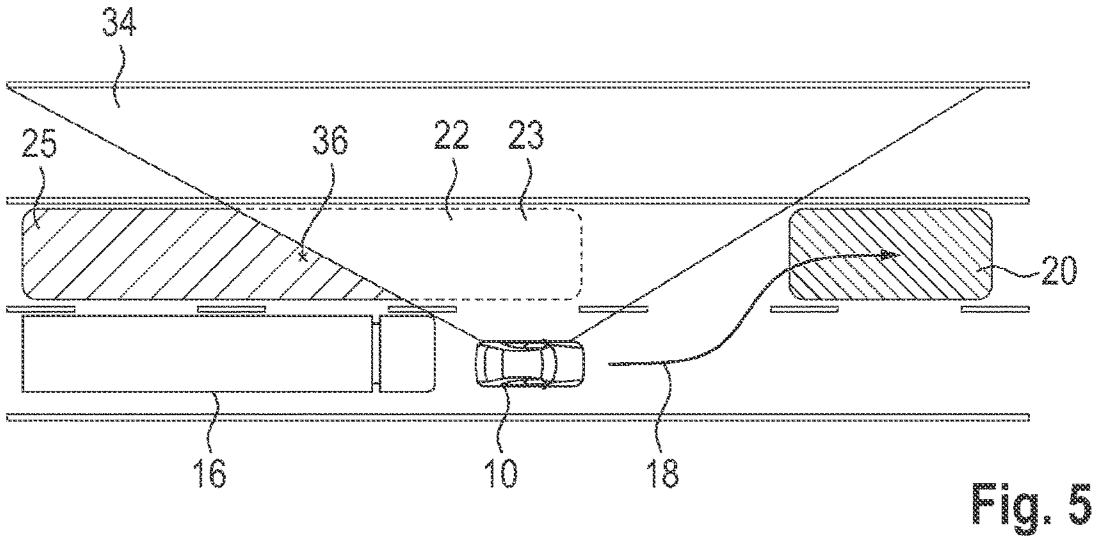

A representation is shown in FIG. 5 that is analogous to FIG. 1, wherein, in this case too, an observation area 34 of the vehicle 10 is depicted. In this case, however, it is assumed that the other road user 16 positioned behind the vehicle 10 in the form of the truck at least partially conceals the view of the environment by the (sensors of the) vehicle 10. Accordingly, the observation area 22 is also divided here into an observable and a non-observable portion 23, 25. The danger of a collision with another road user 16 potentially present in the non-observable area 25 can be assessed, analogously to FIG. 4, based on an expected size and/or expected speed, in particular starting from an analogous position 36.

Figure 6:
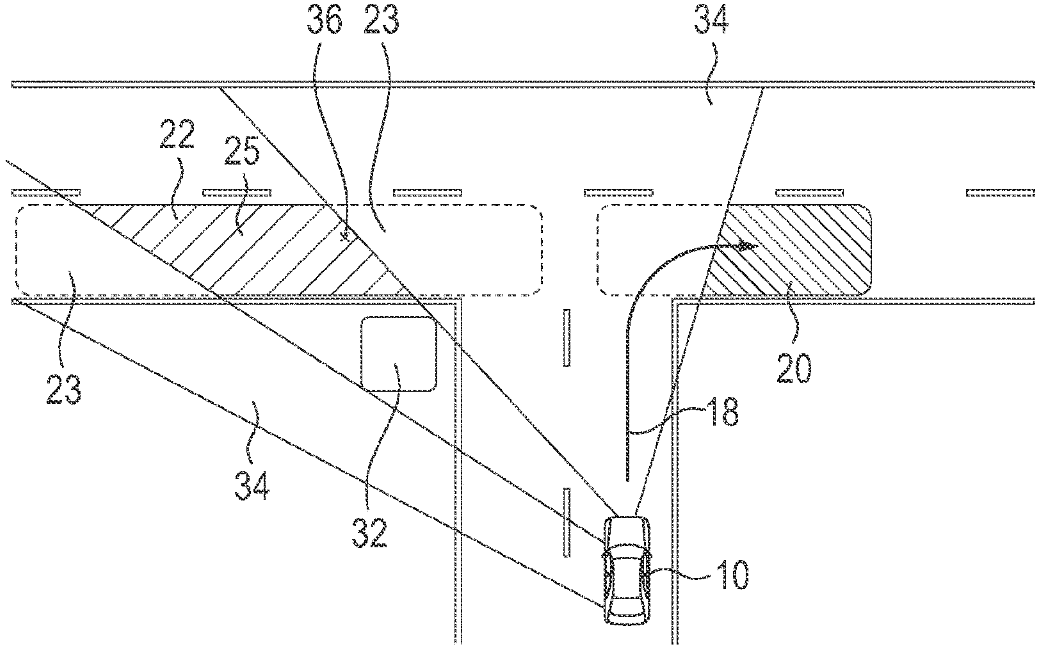

In FIG. 6, a special case is shown in which an observation area 22 is partially concealed from the view of the vehicle. The driving maneuver shown by way of example corresponds to a turning process analogous to FIG. 3. Deviating from FIG. 3, however, no bike path 30 is provided in this case. Due to an obstacle 32, the view of the environment area 22 by the vehicle 10 or, respectively, by its surroundings sensors is in turn blocked. In general, the term "view" in this disclosure is not used such that only optical or camera-based detections are to be understood. Instead, any other detection principles of surroundings sensors can also be included, in particular ultrasonic or radar detections. In this respect, the term "view" can be understood as the more specialized case that detections by surroundings sensors of the vehicle 10 are possible or, respectively, a detection area 34 thereof extends accordingly in the environment.

The detection area 34 of the vehicle 10 is divided in two, since, from the view of the vehicle, no detections by means of sensors are possible diagonally behind the obstacle 32. A portion 25 of the observation area 22 positioned there is accordingly not observable. The non-observable portion 25 is framed or, respectively, enclosed or delimited by observable portions 23. Thus, a non-observable portion 25 is located between the observable portions 23 of the observation area 22. To perform the planned driving maneuver, it must be ensured that no road user 16 (not shown) located in the non-observable portion 25 can possibly drive into the conflict area 20. Once again, this can be established based on the type of expected road users and in particular based on the type of their size. If the non-observable portion 25 is smaller than the expected size, it can be assumed that no corresponding road user 16 is located there.

Additionally or alternatively, it can be established based on the expected speed whether a road user 16 that may be located in the non-observable portion 25 would already have had to drive out of it and drive into the adjoining observable portion 23 that is closer to the conflict area 20. If this is not the case, it can be inferred that no corresponding road user 16 is located in the non-observable portion 25.

For example, in an additional check, the scenario can be examined that the user is in the non-observable portion 25 and/or moves with a very low speed and begins to maximally accelerate before or while the driving maneuver is being performed. For example, once again starting from a position 36 positioned nearest to the conflict area within the non-observable portion 25, the distance a corresponding road user 16 travels at its expected achievable speed and/or acceleration while the driving maneuver is being performed can be calculated. If this distance is sufficient to drive into the conflict area 20, an increased risk of conflict can be determined and the driving maneuver cannot be performed as planned. If, however, it is established that the conflict area 20 cannot be reached, the driving maneuver can be performed in the planned manner because such an undetected potential road user does not represent a danger.

Figure 7:
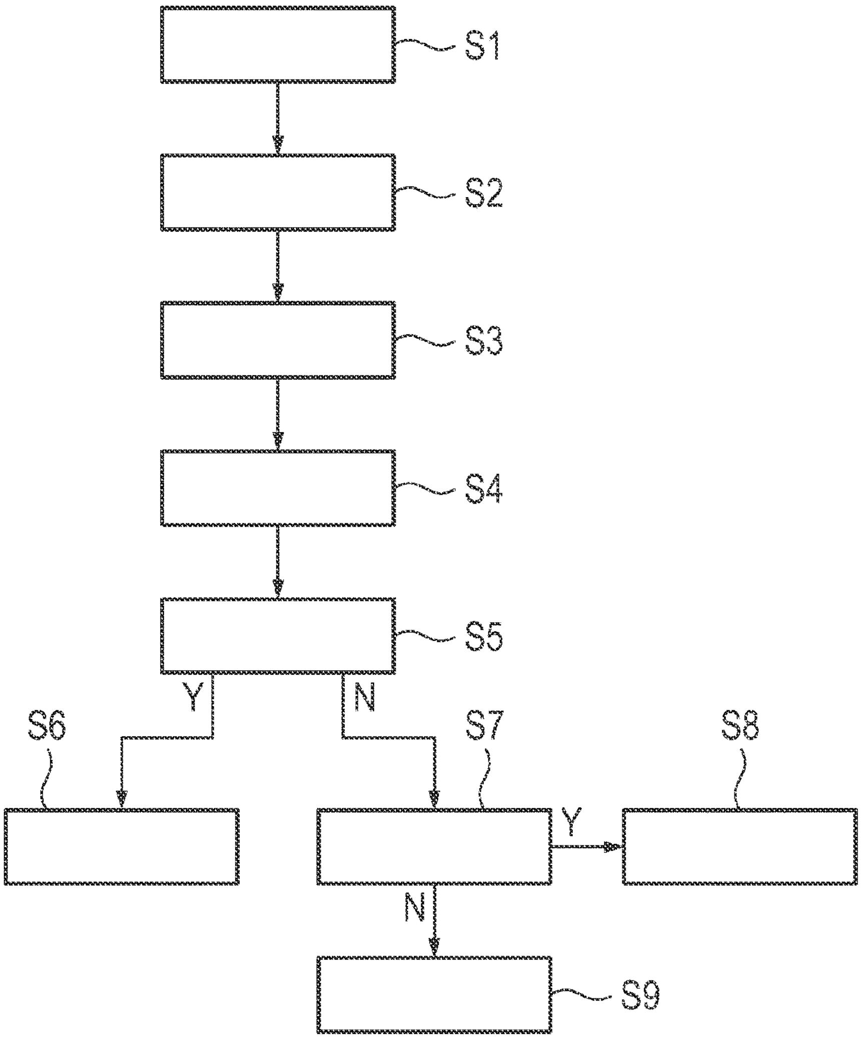
FIG. 7 shows an example flow diagram of a method.

In FIG. 7, an exemplary method sequence is explained, which refers to the preceding exemplary embodiments. In one step S1, it is determined that the motor vehicle 10 would like to perform a planned driving maneuver that is associated with a risk of conflict with other road users. For this purpose, the driving maneuver can be compared to defined conflict-prone driving maneuvers defined accordingly in advance. It can also be established based on map information that other lanes or generally potential conflict areas are to be traversed according to the driving maneuver.

In one step S2, the conflict area 20 associated with the planned driving maneuver is determined, for example, based on map information and/or dynamically in the context of a planned lane change. In one step S3, it is then determined which observation areas 22 must principally be defined. The principle assignment of required observation areas 22 for a conflict area 10 can be predefined and saved, for example, in a memory apparatus of the control apparatus 14 from FIG. 1. Thus, for example, in the case of the planned turning process from FIG. 10, other observation areas 22 that detect both lanes 26, 28 can normally be relevant than in the case of the turning process from FIG. 3, in which only one lane 28 must be observed.

In one step S4, which can also be carried out in parallel with step S3, at least one dimension L of at least one of the observation areas 22 to be defined is determined, for example in real time and/or in a situation-dependent manner. Depending on the current driving situation and/or the planned driving maneuver, any of the circumstances to be taken into account that are disclosed herein and in particular that are explained based on FIGS. 1 to 3 can be considered.

In one step S5, it is determined whether the entire observation area 22 can be observed or an observable portion 25 is above a permissible minimum value (and/or a non-observable portion 23 is below a maximum value). If this is the case (arrow Y in FIG. 7), the planned driving maneuver is performed in the originally planned way in step S6. If this is not the case (arrow N in FIG. 7), it is determined in step S7, for example by means of a variant explained based on FIGS. 4 to 6, whether a non-observable or, respectively, undetected road user 16 that can mean a collision hazard while the driving maneuver is being performed could be present in the non-observable portion 25.

If it can be ruled out that such a potential for conflict exists (arrow Y), the driving maneuver is performed in the originally planned way in step S8. If such a risk of collision cannot be ruled out (arrow N), in step S9 the performance of the driving maneuver and the traversing of the conflict area 20 related thereto is controlled in a way that deviates from the originally planned way.

In particular, a vehicle speed 10 can then be reduced in order to allow more time to elapse before the conflict area 20 is reached. This increases the chance that, taking into account, for example, an expected speed of potentially concealed road users 16, it can be consistently ruled out that they drive out of the non-observable portion 25 and/or drive into the conflict area 20. In particular, the speed can also be reduced so much that the vehicle 10 temporarily stops. It is also possible in principle that the motor vehicle 10 changes its position within a lane and drives closer to the side in order to potentially enlarge the observation area 34 or, respectively, the observable portion 23 of the observation area 22.

Alternatively or additionally, the vehicle 10 can drive into the conflict area 20 with a significantly reduced and in particular a predetermined minimum speed. The observation area 22 can in this case continue to be continuously monitored. Due to the minimum speed, braking or acceleration can take place in a timely manner in order to prevent a collision with undetected road users.

In summary, the exemplary embodiments above have demonstrated possibilities in order to establish an observation area 22 dynamically and in a manner that is as appropriate to the situation as possible. This makes it possible for the observation area 22 to be as large as necessary but also as small as possible. Furthermore, possibilities have been demonstrated that show how scenarios can be handled in which observation areas are only partially observable.

LIST OF REFERENCE NUMERALS

10 Vehicle (motor vehicle)
11 Lane
12 Road
13 Lane
14 Control device
15 Lane
16 Road user
18 Movement arrow
20 Conflict area
22 Observation area
23 Observable portion
24 (Intersecting) road
25 Non-observable portion
26 Lane
27 Priority road
28 Lane
30 Bike path
32 Obstacle object
34 Observation area
36 Position for assessing the potential for collision
L Dimension The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a motor vehicle at least partially autonomously, comprising:

obtaining at least one potential conflict area in which there is a potential for conflict with other road users, wherein the at least one potential conflict area is to be traversed by the motor vehicle according to a planned driving maneuver;

determining at least one observation area which, for the purpose of traversing the conflict area, is to be observed in order to avoid conflicts with the other road users and which at least one observation area is at least partially different from the at least one potential conflict area;

determining at least one dimension of the at least one observation area taking into account at least one of the following:

a speed of the motor vehicle; and a type of a road user expected in the at least one observation area;

monitoring using sensors the at least one observation area in a targeted way to determine whether at least one other road user is occupying the at least one observation area;

in case at least one other road user is occupying the at least one observation area, selectively determining, whether the at least one other road user occupying the at least one observation area presents a collision risk or not; and selectively controlling the motor vehicle at least partially autonomously taking into account whether or not the at least one other road user is occupying the at least one observation area and whether or not the at least one other road user presents a collision risk.

2. The method of claim 1, comprising determining at least one dimension of the at least one observation area taking into account at least the speed of the motor vehicle, wherein the dimension gets larger as speed of the motor vehicle increases.

3. The method of claim 1, comprising determining at least one dimension of the at least one observation area taking into account at least the speed of the motor vehicle, wherein, when a priority road traversed by the other road users is in the at least one potential conflict area, the dimension gets smaller as the speed of the motor vehicle increases.

4. The method of claim 1, comprising determining at least one dimension of the at least one observation area taking into account at least the type of a road user expected in the at least one observation area; wherein an expected speed of the expected road user is obtained and the dimension gets larger the greater the expected speed is.

5. The method of claim 4, wherein the expected speed is determined taking into account map information.

6. The method of claim 1, comprising determining at least one dimension of the at least one observation area taking additionally into account at least an observed state of traffic infrastructure, wherein, when the observed state of traffic infrastructure indicates a lack of traversability of a part of an environment, the dimension of the at least one observation area is determined such that the portion of a non-traversable part in relation to the at least one observation area is below a permissible maximum portion.

7. The method of claim 1, comprising:

determining a portion of the at least one observation area that can be observed by the motor vehicle and/or a portion that cannot be observed by the motor vehicle and, based thereon, controlling the traversing of the at least one potential conflict area.

8. The method of claim 7, wherein, when the observable portion is below a minimum portion and/or non-observable portion is above a maximum portion:

obtaining at least one type of a road user expected in the at least one observation area;

establishing that no other road user is located in the at least one observation area, on the basis of the observable portion and/or the non-observable portion of the at least one observation area and the type of road user.

9. The method of claim 7, wherein, when a non-observable portion of the at least one observation area is positioned between at least two observable portions, a maximally possible speed of another road user that is potentially located in the non-observable portion is determined.

10. A control device for a motor vehicle, which is configured to:

obtain at least one potential conflict area in which there is a potential for conflict with other road users, wherein the at least one potential conflict area is to be traversed by the motor vehicle according to a planned driving maneuver;

determine at least one observation area which, for the purpose of traversing the conflict area, is to be observed in order to avoid conflicts with the other road users and which at least one observation area is at least partially different from the at least one potential conflict area;

determine at least one dimension of the at least one observation area taking into account at least one of the following:

a speed of the motor vehicle; and a type of a road user expected in the at least one observation area;

monitor using sensors the at least one observation area in a targeted way to determine whether at least one other road user is occupying the at least one observation area;

in case at least one other road user is occupying the at least one observation area, selectively determining, whether the at least one other road user occupying the at least one observation area presents a collision risk or not; and to selectively control the motor vehicle at least partially autonomously taking into account whether or not the at least one other road user is occupying the at least one observation area and whether or not the at least one other road user presents a collision risk.

11. The method of claim 2, comprising:

determining a portion of the at least one observation area that can be observed by the motor vehicle and/or a portion that cannot be observed by the motor vehicle and, based thereon, controlling the traversing of the at least one potential conflict area.

12. The method of claim 3, comprising:

determining a portion of the at least one observation area that can be observed by the motor vehicle and/or a portion that cannot be observed by the motor vehicle and, based thereon, controlling the traversing of the at least one potential conflict area.

13. The method of claim 4, comprising:

determining a portion of the at least one observation area that can be observed by the motor vehicle and/or a portion that cannot be observed by the motor vehicle and, based thereon, controlling the traversing of the at least one potential conflict area.

14. The method of claim 5, comprising:

determining a portion of the at least one observation area that can be observed by the motor vehicle and/or a portion that cannot be observed by the motor vehicle and, based thereon, controlling the traversing of the at least one potential conflict area.

15. The method of claim 6, comprising:

determining a portion of the at least one observation area that can be observed by the motor vehicle and/or a portion that cannot be observed by the motor vehicle and, based thereon, controlling the traversing of the at least one potential conflict area.

16. The method of claim 8, wherein, when a non-observable portion of the at least one observation area is positioned between at least two observable portions, a maximally possible speed of another road user that is potentially located in the non-observable portion is determined.

* * * * *